United States Patent [19]

Foster

[11] Patent Number: 4,764,197
[45] Date of Patent: Aug. 16, 1988

[54] SUPPORT FOR AN OPERATIVE MEMBER OF A GLASSWARE FORMING MACHINE

[75] Inventor: Thomas V. Foster, Doncaster, United Kingdom

[73] Assignee: Emhart Industries, Inc., Farmington, Conn.

[21] Appl. No.: 47,074

[22] Filed: May 5, 1987

[30] Foreign Application Priority Data

May 23, 1986 [GB] United Kingdom ............... 8612712

[51] Int. Cl.⁴ ................................................ C03B 9/40
[52] U.S. Cl. ....................................... 65/260; 65/261; 65/300
[58] Field of Search ................. 65/242, 260, 265, 267, 65/319, 356, 261, 300

[56] References Cited

U.S. PATENT DOCUMENTS 3,477,841 11/1969 Fouse ............................ 65/242 X
4,618,356 10/1986 Hirt et al. ...................... 65/260 X Primary Examiner—Arthur Kellogg
Attorney, Agent, or Firm—Spencer T. Smith

[57] ABSTRACT

The support is for an operative member, e.g. a funnel, a baffle or a blowhead, which moves between operative and out-of-the-way positions along a path which has a vertical component and an arcuate component about a vertical axis. The support comprises a first portion (16), a second portion (30) movable vertically relative to the first portion, and clamping means (18,20,28) operable to clamp the first portion to the piston rod (14) of a piston and cylinder assembly which moves the member. The operative member is mounted on the second portion (30) and moving means (32,36) is operable to move the second portion (30) vertically relative to the first portion (16). Operation of the moving means (32,36) can be used to increase the vertical component of the path.

2 Claims, 2 Drawing Sheets

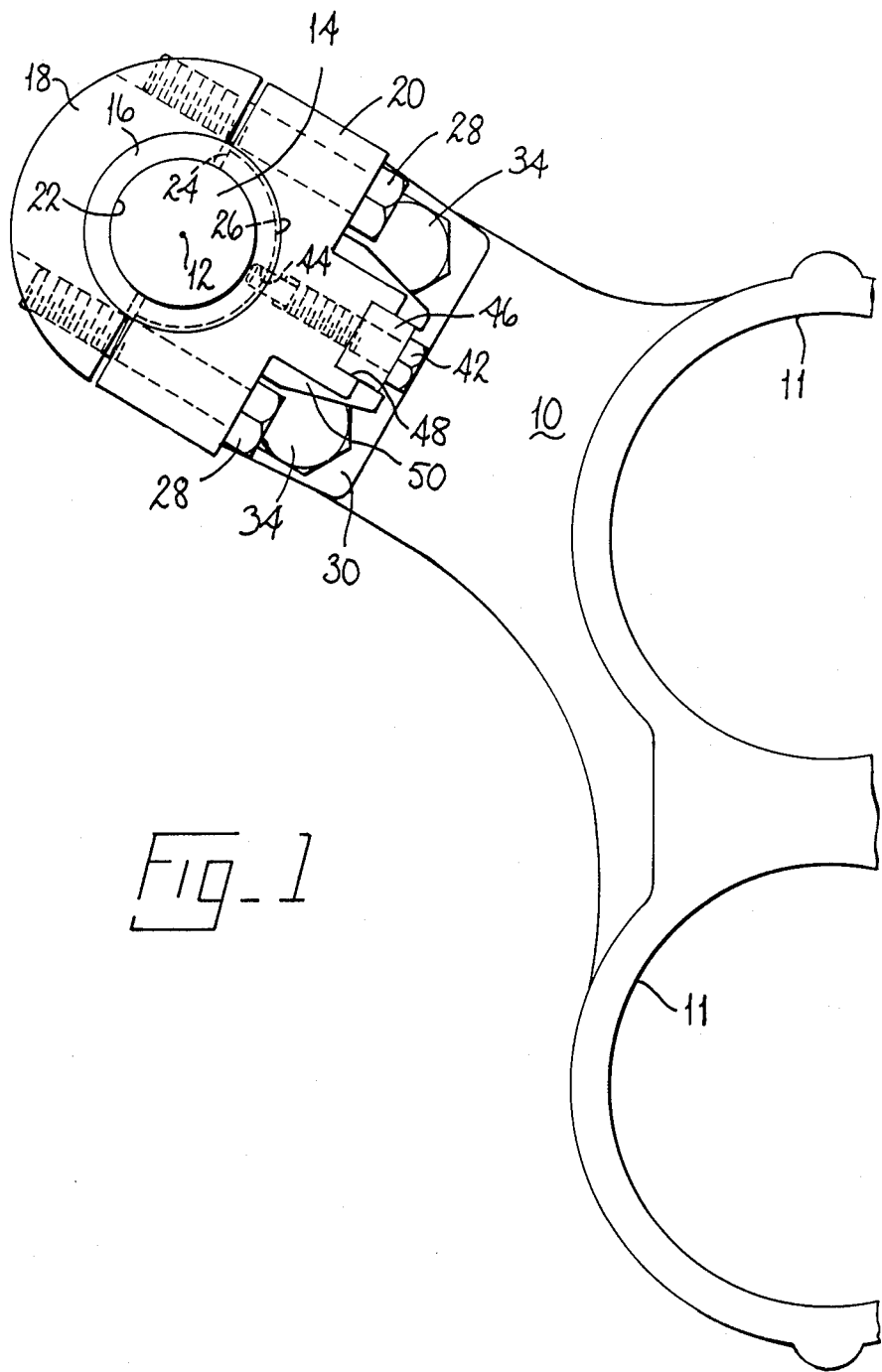
Fig_1

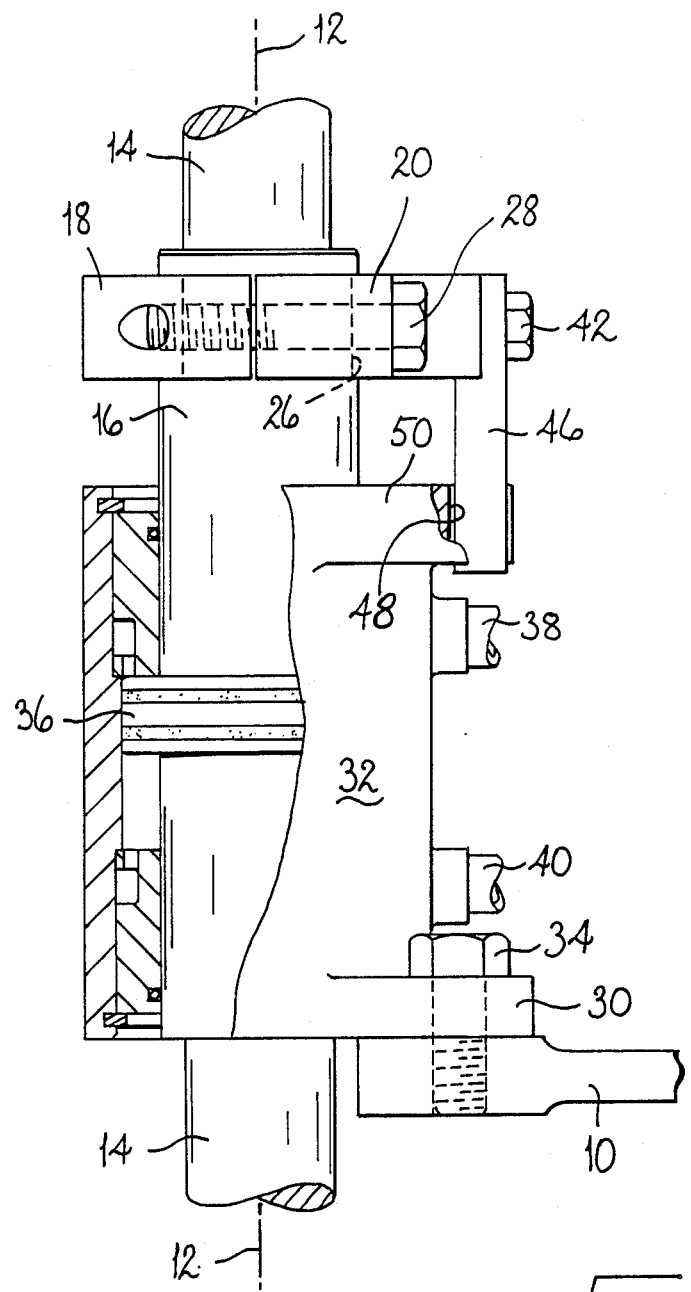
Fig_2

SUPPORT FOR AN OPERATIVE MEMBER OF A GLASSWARE FORMING MACHINE

BACKGROUND OF THE INVENTION

This invention is concerned with a support for an operative member of a glassware forming machine of the individual section type, the member moving, in a cycle of operation of the machine, between operative and out-of-the-way positions thereof along a path which has a vertical component and an arcuate component about a vertical axis.

In a glassware forming machine of the individual section type, three operative members, namely the baffle, the funnel, and the blowhead, make movements which are along a path which has a vertical component and an arcuate component about a vertical axis. The funnel is moved into an operative position on top of a blank mould of the machine so that the funnel can guide gobs of molten glass into the mould and is then moved to its out-of-the-way position. The blowhead is moved in similar manner to the funnel but into position on a finish mould of the machine so that air can be blown through the blowhead into a parison in the blow mould to cause the parison to expand to the shape of the mould. The movements of the baffle depend on whether the machine is carrying out a press-blow process of moulding glass or a blow-blow process. In the press-blow process, the baffle is moved on top of the blank mould after the funnel has been removed therefrom and closes the opening of the mould cavity so that when a plunger is introduced into the mould from below the gob in the mould is pressed against the baffle and side portions of the mould to the shape of a parison. In the blow-blow process, the baffle is first moved on top of the funnel while the funnel is still on the blank mould so that air can be blown through the baffle and the funnel into the mould to force the glass gob therein downwardly, the baffle is then removed so that the funnel can be removed and then the baffle is placed on the blank mould so that the baffle closes the opening of the mould cavity and enables a parison to be blown in the mould cavity against the baffle and the side portions to the mould.

The movements of the funnel, baffle and blowhead in a glassware forming machine of the individual section type are each brought about by a fluid-pressure operated moving mechanism. Such a moving mechanism is well known and is generally described in U.S. Pat. No. 1,911,119 (FIG. 4). The mechanism comprises a vertically-extending cylinder, a piston movable vertically in the cylinder upon the introduction of fluid under pressure into the cylinder, a piston rod projecting from said piston along said vertical axis, and cam means acting on a second piston rod projecting from said piston in the opposite direction to said first piston rod, to cause the piston rod to turn about the vertical axis as it moves vertically. The operative member is mounted on an arm which projects from and is fixedly mounted on said first piston rod of the mechanism so that motion of the piston rod caused by movement of the piston in the cylinder causes the operative member to move vertically with the piston rod and to be moved arcuately as the piston rod is turned about its vertical axis. Such moving mechanisms are tried and tested and are in use on machines of the individual section type throughout the world.

Although the moving mechanisms described above have been designed to give the required vertical and arcuate components to the path movement of the operative member, a recent development in the method of cooling the blank moulds has made it desirable to be able to increase the vertical component of said path. This recent development is described in European Patent No. 0 153 534 and relates to the provision of plenum chambers projecting over the top of the mould side portions so that air can be supplied from the plenum chambers into passages passing vertically downwardly through the mould side portions. Because of the presence of these plenum chambers, it is desirable to be able to increase the vertical component of the path of movement of the funnel so that the funnel clears these plenum chambers. It is also possible to envisage circumstances in which the vertical component of the path of movement of a baffle or a blowhead would need to be increased.

It is an object of the present invention to provide a support for an operative member of a glassware forming machine of the individual section type which enables the vertical component of the path of movement of the operative member to be increased while enabling a conventional moving mechanism to be utilised.

BRIEF DESCRIPTION OF THE INVENTION

The invention provides a support for an operative member of a glassware forming machine of the individual section type, the member moving, in a cycle of operation of the machine, between operative and out-of-the-way positions thereof along a path which has a vertical component and an arcuate component about a vertical axis, movement of the member being brought about by a fluid-pressure operated moving mechanism comprising a vertically-extending cylinder, a piston movable vertically in the cylinder upon the introduction of fluid under pressure into the cylinder, a piston rod projecting from said piston along said vertical axis, and cam means acting on the piston rod, or on a second piston rod projecting from said piston in the opposite direction to said piston rod, to cause the piston rod to turn about the vertical axis as it moves vertically, the support comprising a first portion, a second portion movable vertically relative to the first portion, clamping means operable to clamp the first portion to the piston rod of the moving mechanism at a predetermined height, and moving means operable to move the second portion vertically relative to the first portion, the operative member being mountable on the second portion of the support.

With the support according to the last preceding paragraph, it is possible to increase the vertical component of the path of movement of the member by operating the moving means of the support. Thus, the arcuate components of the path of movement and most of the vertical component can be carried out by the conventional mechanism which requires no modifications and the additional vertical component can be carried out by the moving means of the support.

Conveniently, said first portion of the support may comprise a tubular rod telescopically-received over the piston rod. Thus, the first portion is firmly located relative to the piston rod and easily adjustable heightwise thereof. Conveniently, said clamping means comprises two cooperating clamp members one of which is received in a slot through said tubular rod so that the clamp member engages the piston rod and the other of which engages the tubular rod. In this way, the support can be firmly clamped to the piston rod. Said moving means may conveniently comprise a piston formed externally on the tubular rod, and a cylinder secured to said second portion of the support, the piston being received in the cylinder so that a fluid-pressure operated piston and cylinder assembly is formed and introduction of fluid under pressure into the cylinder causes the second portion of the support to move vertically relative to the first portion thereof. Thus, a compact and convenient moving means is provided.

Preferably, the support may also comprise locking means operative to prevent said first portion of the support from turning about a vertical axis relative to said clamping means. This arrangement enables the correct alignment to be maintained.

Preferably, said support may also comprise key means operative to prevent said second portion of the support from turning about a vertical axis relative to said clamping means. This arrangement also assists in maintaining the correct alignment.

In order to enable the operative member to be changed without altering the position of the support, the operative member may be mounted on an arm which is detachably mounted on said second portion of the support.

BRIEF DESCRIPTION OF THE DRAWINGS

There now follows a detailed description, to be read with reference to the accompanying drawings, of a support which is illustrative of the invention. It is to be understood that the illustrative support has been selected for description by way of example and not of limitation of the invention.

In the drawings:

FIG. 1 is a plan view of the illustrative support; and

FIG. 2 is a side-elevational view of the illustrative support with parts broken away to show the construction.

DETAILED DESCRIPTION OF PREFERRED EMBODIMENT OF THE INVENTION

The illustrative support is for an operative member, namely a funnel, of a glassware forming machine of the individual section type. The funnel (not shown) and another similar funnel are supported on an arm 10 of the support in locating rings 11. In a cycle of operation of the machine, the funnels move between operative and out-of-the-way positions thereof along a path which has a vertical component and an arcuate component about a vertical axis 12. Movements of the funnel are brought about by a fluid-pressure operated moving mechanism (not shown) of conventional construction comprising a vertically-extending cylinder, a piston movable vertically in the cylinder upon the introduction of fluid under pressure into the cylinder, a piston rod 14 projecting from said piston along said vertical axis 12, and cam means acting on a second piston rod projecting from said piston in the opposite direction to said first piston rod 14 to cause the piston rod 14 to turn about the vertical axis 12 as it moves vertically.

The illustrative support comprises a first portion 16 in the form of a tubular rod telescopically-received over the piston rod 14. The illustrative support also comprises clamping means operable to clamp the tubular rod 16 to the piston rod 14 at a predetermined height. Said clamping means comprises two cooperating clamp members 18 and 20. The clamp member 18 is generally u-shaped and has an arcuate surface 22 which is received in a slot 24 through said tubular rod 16 so that the clamp member 18 engages the piston rod 14. The other clamp member 20 is arranged in opposed relationship to the clamp member 18 on the opposite side of the piston rod 14 and is located in a groove 26 formed in the tubular rod 16. Two clamping screws 28 pass through the clamp member 20 and are threadedly received in the clamp member 18 on opposite sides of the piston rod 14. Tightening the clamping screws 28 forces the clamp member 20 against the tubular rod 16 within the groove 26 and the clamp member 18 against the piston rod 14 within the slot 24 so that the tubular rod 16 is firmly fixed to the piston rod 14 at the predetermined height.

The illustrative support also comprises a second portion 30 which is movable vertically relative to the first portion formed by the tubular rod 16. The second portion 30 is formed as a flange projecting horizontally from a cylinder 32 to be described further below. The arm 10 is mountable on the flange 30 of the support by means of two fixing screws 34 so that the funnels are mounted on an arm which is detachably mounted on the flange 30. Furthermore, vertical movement of the flange 30 relative to the tubular rod 16 causes the funnels to move vertically relative to the piston rod 14.

The illustrative support also comprises moving means operable to move the second portion of the support provided by the flange 30 vertically relative to the first portion provided by the tubular rod 16. The moving means comprises a piston 36 formed externally on the tubular rod 16 and the aforementioned cylinder 32 which as aforementioned is secured to said second portion of the support formed by the flange 30. The piston 36 is received in the cylinder 32 so that a fluid-pressure operated piston and cylinder assembly is formed and introduction of fluid under pressure into the cylinder 32 through an upper port 38 or a lower port 40 thereof causes the flange 30 to move vertically downwardly or upwardly relative to the tubular portion 16 so that the funnels move vertically relative to the piston rod 14. Thus, the stroke of the piston and cylinder assembly 32,36 can be used to increase the vertical component of the path of movement of the funnels supported by the arm 10.

The illustrative support also comprises locking means operative to prevent said first portion of the support formed by the tubular rod 16 from turning about a vertical axis 12 relative to said clamping means 18,20. Said locking means is provided by a locking screw 42 threadedly received in a bore in the clamping member 20. Locking screw 42 enters a bore 44 in the tubular rod 16 to prevent the clamp member 20 from turning relative to the tubular rod 16. The support also comprises key means operative to prevent said second portion of the support provided by the flange 30 from turning about the vertical axis 12 relative to said clamping means 18,20. Said key means is provided by a key member 46 mounted on the locking screw 42 and projecting downwardly therefrom. The key member 46 enters vertical slot 48 in a flange 40 projecting horizontally from the cylinder 32. Thus, enagement of the key member 46 with the external surfaces of the slot 48 prevents the cylinder 32 and hence the flange 30 from turning relative to the clamping means 18,20. The vertical movement of the cylinder 32 causes the slot 48 to move past the key member 46.

I claim:

1. An operative member assembly for an individual section type glassware forming machine comprising:

a horizontally disposed arm for supporting operative members such as funnels or the like, means for elevating said arm from a lowered position to alternate upper positions including a first vertical piston rod adapted to be vertically displaced from a down position to an up position, a vertically oriented cylinder having a second vertical piston rod adapted to be vertically displaced from a lower position to an upper position, said first piston rod being telescopically received by said second piston rod, means for securing said cylinder to said arm, and means for securing said second piston rod to said first piston rod whereby said arm can be elevated to a first position by advancing said first piston rod from said down position to said up position or to a second position by advancing said first piston rod from said down position to said up position and by raising said second piston from said lower position to said upper position.

2. An operative member according to claim 1, further comprising means for preventing the rotation of said second piston rod.

* * * * *